United States Patent [19]
Sakamoto et al.

[11] Patent Number: 5,903,553
[45] Date of Patent: May 11, 1999

[54] ENHANCED SIGNAL COLLISION DETECTION METHOD IN WIRELESS COMMUNICATION SYSTEM

[75] Inventors: Atsushi Sakamoto, Hino; Atsushi Endo, Sagamihara, both of Japan

[73] Assignees: Victor Company of Japan, Ltd., Yokohama; NTT Data Communications Systems Corporation, Tokyo, both of Japan

[21] Appl. No.: 08/762,124

[22] Filed: Dec. 9, 1996

[30] Foreign Application Priority Data

Dec. 8, 1995 [JP] Japan ................................ 7-345537

[51] Int. Cl.$^6$ ............................................. H04L 12/413
[52] U.S. Cl. ............................................. 370/338; 370/445
[58] Field of Search ................................ 370/286, 287, 370/445, 447, 338, 315; 340/147

[56] References Cited

U.S. PATENT DOCUMENTS

| | | | |
|---|---|---|---|
| 4,063,220 | 12/1977 | Metcalfe et al. | 340/147 |
| 5,553,069 | 9/1996 | Ueno et al. | 370/315 |
| 5,640,390 | 6/1997 | Sakamoto et al. | 370/445 |
| 5,689,510 | 11/1997 | Jacquet et al. | 370/445 |

*Primary Examiner*—Chi H. Pham
*Assistant Examiner*—Maikhanh Tran
*Attorney, Agent, or Firm*—Pollock, Vande Sande & Amernick

[57] ABSTRACT

A wireless communication system includes a repeater and a terminal device. The terminal device is connected to the repeater via a wireless communication channel. The terminal device includes a first section for converting a first electric signal into a first wireless signal, and transmitting the first wireless signal toward the repeater along the wireless communication channel. The terminal device includes a second section for receiving a second wireless signal from the repeater via the wireless communication channel, and converting the second wireless signal into a second electric signal. The terminal device includes a third section for deciding whether or not the first electric signal and the second electric signal are equal to each other to detect whether or not a signal collision occurs on the wireless communication channel.

3 Claims, 4 Drawing Sheets

ENHANCED SIGNAL COLLISION DETECTION METHOD IN WIRELESS COMMUNICATION SYSTEM

BACKGROUND OF THE INVENTION

1. Field of the Invention

This invention relates to a wireless communication system using light wave, radio wave, or the like.

2. Description of the Prior Art

In a wired LAN (local area network), terminal devices are connected to each other via wires. The terminal devices can communicate with each other via the wires.

It is known to combine a wired LAN and a wireless communication network. For example, a wired LAN is additionally provided with an access point device (a gateway device) which can execute both wired communication and wireless communication. The access point device is connected via wires to normal terminal devices in the wired LAN. The access point device can communicate with the normal terminal devices in the wired LAN via the wires. Also, the access point device can execute wireless communication with terminal devices in a wireless communication network. In this case, the wired LAN and the wireless communication network are connected via the access point device (the gateway device). In addition, the access point device is a member of the wired LAN as well as a member of the wireless communication network.

In a wireless communication network, if two terminal devices simultaneously transmit wireless signals toward another terminal device, the transmitted wireless signals collide with each other. In this case, both the transmission-side terminal devices fail to normally communicate with the reception-side terminal device.

There is a wireless communication network of a CSMA (carrier sense multiple access) type. In the CSMA wireless communication network, when a terminal device is required to transmit a wireless signal, the terminal device executes a process of sensing a carrier to check whether a communication channel is occupied or unoccupied. When the communication channel is unoccupied, the terminal device executes the transmission of the wireless signal. When the communication channel is occupied, the terminal device falls into a stand-by state to avoid a signal collision.

In a wired LAN, if two terminal devices simultaneously transmit signals toward another terminal device via a common bus wire, the transmitted signals collide with each other. In this case, both the transmission-side terminal devices fail to normally communicate with the reception-side terminal device.

There is a wired LAN of a CD (collision detection) type. In such a wired LAN, every terminal device monitors the level of a voltage at a common bus wire to check whether the common bus wire is occupied or unoccupied. The information of whether the common bus wire is occupied or unoccupied is used in avoiding a signal collision.

There is a wired LAN having a star connection between a hub device and terminal devices. The connection between the hub device and each terminal device includes a duplex line. Such a wired LAN intrinsically has a function of avoiding a signal collision.

SUMMARY OF THE INVENTION

It is an object of this invention to provide an improved wireless communication system.

A first aspect of this invention provides a terminal device in a wireless communication system having a wireless communication channel which comprises first means for converting a first electric signal into a first wireless signal, and transmitting the first wireless signal along the wireless communication channel; second means for receiving a second wireless signal along the wireless communication channel, and converting the second wireless signal into a second electric signal; and third means for deciding whether or not the first electric signal and the second electric signal are equal to each other to detect whether or not a signal collision occurs on the wireless communication channel.

A second aspect of this invention is based on the first aspect thereof, and provides a terminal device further comprising fourth means for generating a third electric signal representative of occurrence of a signal collision on the wireless communication channel when the third means decides that the first electric signal and the second electric signal are not equal to each other.

A third aspect of this invention is based on the second aspect thereof, and provides a terminal device further comprising fifth means for generating the third electric signal from the first electric signal.

A fourth aspect of this invention provides a wireless communication system comprising a repeater; and a terminal device connected to the repeater via a wireless communication channel; wherein the terminal device comprises a) first means for converting a first electric signal into a first wireless signal, and transmitting the first wireless signal toward the repeater along the wireless communication channel; b) second means for receiving a second wireless signal from the repeater via the wireless communication channel, and converting the second wireless signal into a second electric signal; and c) third means for deciding whether or not the first electric signal and the second electric signal are equal to each other to detect whether or not a signal collision occurs on the wireless communication channel.

A fifth aspect of this invention is based on the fourth aspect thereof, and provides a wireless communication system wherein the terminal device further comprises d) fourth means for generating a third electric signal representative of occurrence of a signal collision on the wireless communication channel when the third means decides that the first electric signal and the second electric signal are not equal to each other.

A sixth aspect of this invention is based on the fifth aspect thereof, and provides a wireless communication system wherein the terminal device further comprises e) fifth means for generating the third electric signal from the first electric signal.

A seventh aspect of this invention provides a wireless communication system comprising a repeater; and a terminal device connected to the repeater via a wireless communication channel; wherein the repeater comprises a) first means for receiving a first wireless signal from the terminal device via the wireless communication channel; b) second means for converting an electric signal into a second wireless signal, and transmitting the second wireless signal toward the terminal device along the wireless communication channel; c) third means for detecting whether or not the electric signal is present; d) fourth means for disabling the second means, and repeating the first wireless signal and transmitting the first wireless signal toward the terminal device along the wireless communication channel when the third means detects that the electric signal is not present; and e) fifth means for enabling the second means and inhibiting the fourth means from repeating the first wireless signal when the third means detects that the electric signal is present.

DESCRIPTION OF THE PREFERRED EMBODIMENT

Figure 1:
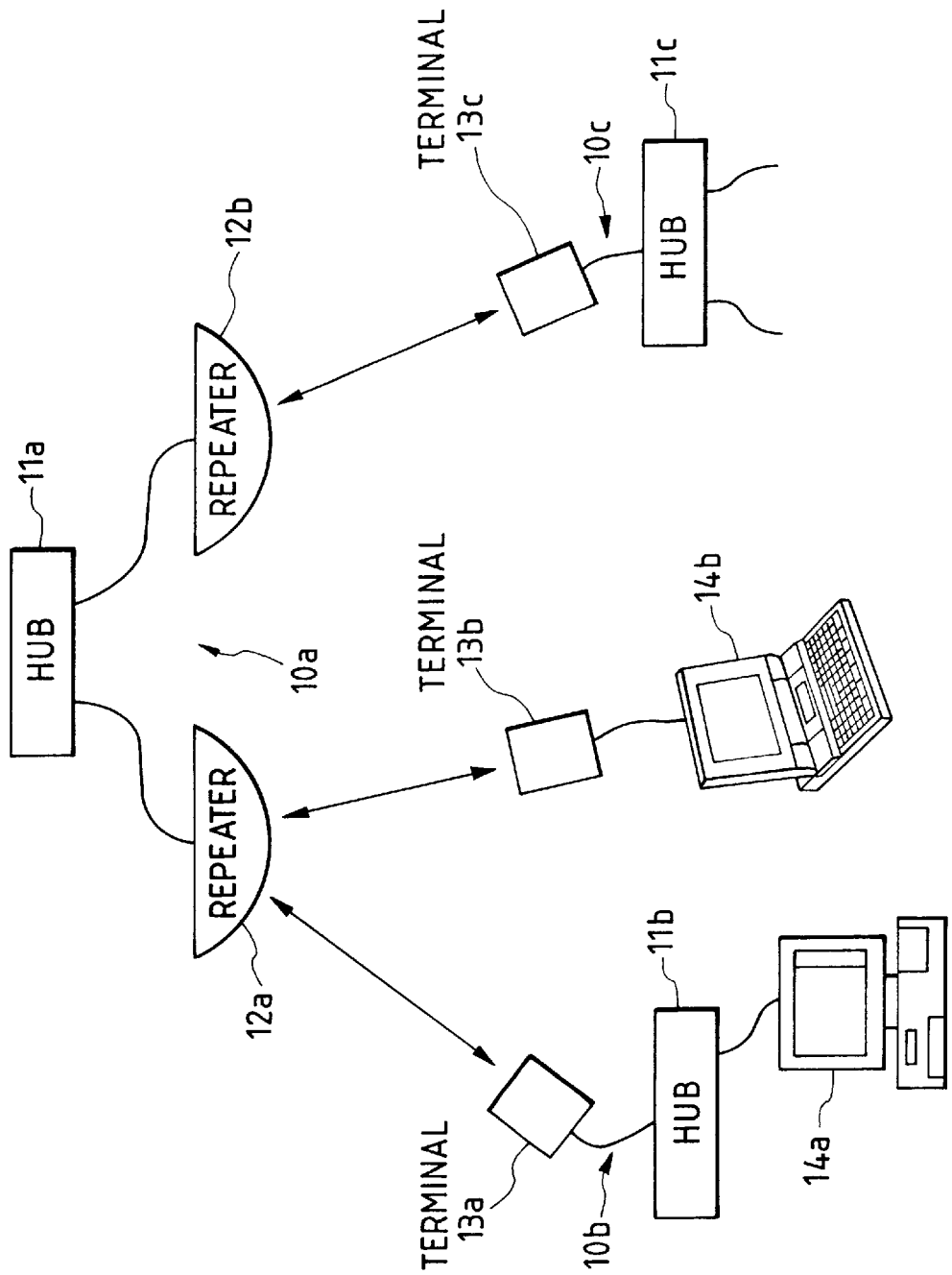
FIG. 1 is a diagram of a combination of wired LAN's and a wireless communication network.

With reference to FIG. 1, a wired LAN 10a includes a hub device 11a and repeaters 12a and 12b. The wired LAN 10a conforms to, for example, the 10BASE-T standards in "ISO8802-3". The repeaters 12a and 12b are connected to the hub device 11a via wires providing a star connection. The repeater 12a and the hub device 11a can bidirectionally communicate with each other via the related wire. The repeater 12b and the hub device 11a can bidirectionally communicate with each other via the related wire.

A wireless communication network includes the repeaters 12a and 12b, and also terminal devices 13a, 13b, and 13c. The wireless communication network uses, for example, light wave. The terminal device 13a and the repeater 12a can bidirectionally communicate with each other by wireless. Thus, the terminal device 13a and the repeater 12a are connected via a wireless communication channel. The terminal device 13b and the repeater 12a can bidirectionally communicate with each other by wireless. Thus, the terminal device 13b and the repeater 12b are connected via a wireless communication channel. The terminal device 13c and the repeater 12b can bidirectionally communicate with each other by wireless. Thus, the terminal device 13c and the repeater 12b are connected via a wireless communication channel.

A wired LAN 10b includes the terminal device 13a, a hub device 11b, and a terminal device 14a. The wired LAN 10b conforms to, for example, the 10BASE-T standards in "ISO8802-3". The terminal devices 13a and 14a are connected to the hub device 11b via wires providing a star connection. The terminal device 13a and the hub device 11b can bidirectionally communicate with each other via the related wire. The terminal devices 14a and the hub device 11b can bidirectionally communicate with each other via the related wire. The terminal device 14a includes, for example, a computer.

The terminal device 13b is connected to a terminal device 14b via a wire. The terminal device 13b and the terminal device 14b can bidirectionally communicate with each other via the wire. The terminal device 14b includes, for example, a computer.

A wired LAN 10c includes the terminal device 13c and a hub device 11c. The wired LAN 10c conforms to, for example, the 10BASE-T standards in "ISO8802-3". The terminal devices 13c is connected to the hub device 11c via a wire. The terminal device 13c and the hub device 11c can bidirectionally communicate with each other via the wire.

The repeaters 12a and 12b have a relatively large half-power angle in the directivity of wireless signal transmission and reception. On the other hand, the terminal devices 13a, 13b, and 13c have a relatively small half-power angle in the directivity of wireless signal transmission and reception. The repeaters 12a and 12b, and the terminal devices 13a, 13b, and 13c are directed so that the terminal devices 13a and 13b can communicate with the repeater 12a by wireless, and that the terminal device 13c can communicate with the repeater 12b by wireless. The terminal device 13c can not access the repeater 12a by wireless. In addition, the repeaters 12a and 12b can not directly communicate with each other by wireless. Furthermore, the terminal devices 13a, 13b, and 13c can not communicate with each other by wireless.

The repeaters 12a and 12b are similar in structure. Therefore, only the structure of the repeater 12a will be explained hereinafter.

Figure 2:
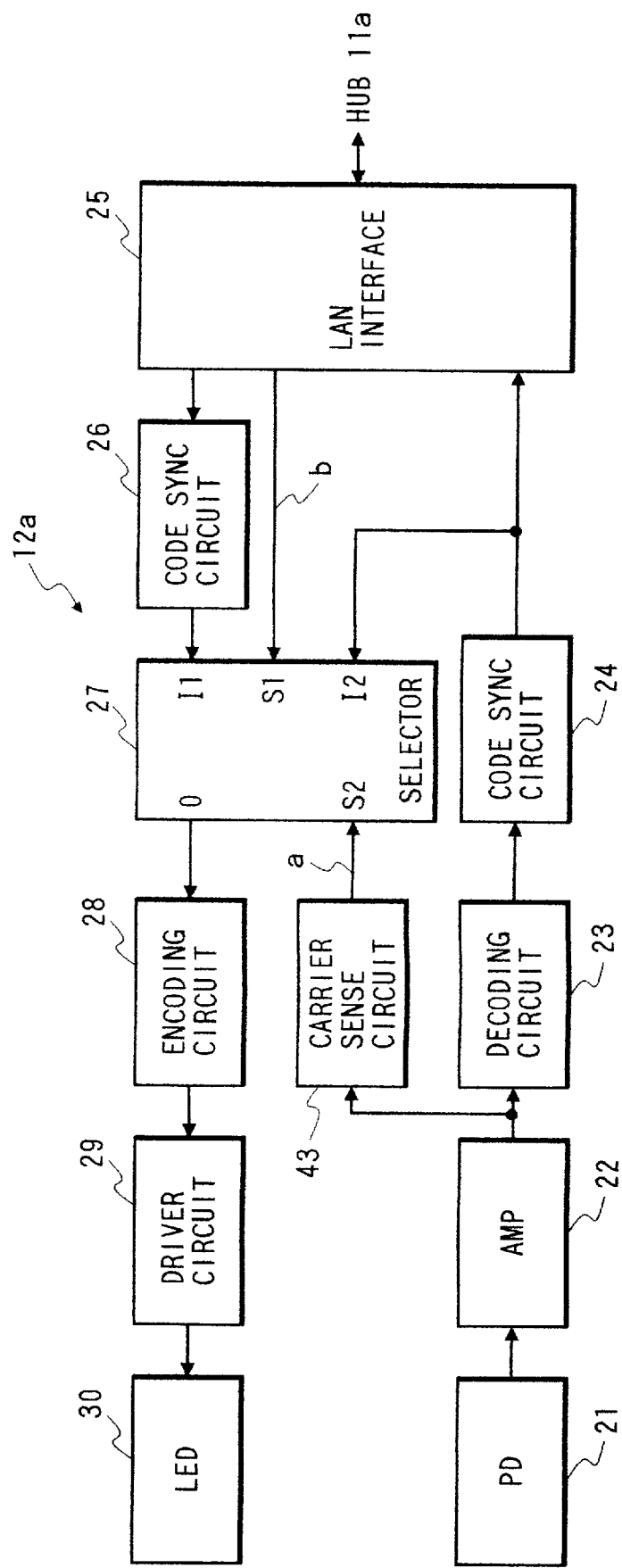
FIG. 2 is a block diagram of a repeater in FIG. 1.

As shown in FIG. 2, the repeater 12a includes a photodiode (or a photodiode array) 21, an amplifier 22, a decoding circuit 23, a code sync circuit 24, a LAN interface 25, a code sync circuit 26, a selector 27, an encoding circuit 28, a driver circuit 29, a light emitting diode (or a light emitting diode array) 30, and a carrier sensing circuit 43.

The photodiode 21 is followed by the amplifier 22. The amplifier 22 is followed by the decoding circuit 23 and the carrier sensing circuit 43. The decoding circuit 23 is followed by the code sync circuit 24. The output terminal of the code sync circuit 24 is connected to the LAN interface 25 and the selector 27. The output terminal of the carrier sensing circuit 43 is connected to the selector 27. The LAN interface 25 is connected to the wire which leads to the hub device 11a (see FIG. 1). The LAN interface 25 is connected to the input terminal of the code sync circuit 26. In addition, the LAN interface 25 is directly connected to the selector 27. The output terminal of the code sync circuit 26 is connected to the selector 27. The selector 27 is connected to the input terminal of the encoding circuit 28. The encoding circuit 28 is successively followed by the driver circuit 29 and the light emitting diode 30.

The photodiode 21 receives an optical signal from the terminal device 13a or 13b (see FIG. 1), and converts the optical signal into a corresponding electric signal. The photodiode 21 outputs the electric signal to the amplifier 22. The amplifier 22 enlarges the output signal of the photodiode 21. The amplifier 22 outputs the enlargement-resultant signal to the decoding circuit 23 and the carrier sensing circuit 43. The output signal of the photodiode 21 or the output signal of the amplifier 22 is equal to a signal which results from modulating a carrier with transmitted information (data). The optical signal handled by the photodiode 21 uses, for example, infrared light or visible light. It should be noted that the optical signal may be replaced by a radio wave signal.

The carrier sensing circuit 43 serves to detect the carrier in the output signal of the amplifier 22. When an optical signal is currently received by the photodiode 21, the carrier sensing circuit 43 detects the presence of the carrier in the output signal of the amplifier 22. When any optical signal is not currently received by the photodiode 21, the carrier sensing circuit 43 detects the absence of the carrier from the output signal of the amplifier 22. The carrier sensing circuit 43 generates a binary detection signal "a" representing whether the carrier is present in or absent from the output signal of the amplifier 22, that is, whether or not an optical signal is currently received by the photodiode 21. Specifically, the detection signal "a" being in a high level state indicates the presence of the carrier in the output signal of the amplifier 22. The detection signal "a" being in a low level state indicates the absence of the carrier from the output signal of the amplifier 22. The carrier sensing circuit 43 outputs the detection signal "a" to a selection terminal S2 of the selector 27.

The decoding circuit 23 decodes the output signal of the amplifier 22 into an information signal (data). In other words, the decoding circuit 23 recovers an information signal (data) from the output signal of the amplifier 22. The decoding circuit 23 outputs the information signal to the code sync circuit 24. The code sync circuit 24 subjects the information signal to a code synchronization process. The code sync circuit 24 outputs the resultant information signal to the LAN interface 25. In addition, the code sync circuit 24 outputs the resultant information signal to an input terminal I2 of the selector 27.

The LAN interface 25 can transmit the output information signal of the code sync circuit 24 to the hub device 11a (see FIG. 1) via the wire. The LAN interface 25 can receive an information signal (data) from the hub device 11a (see FIG. 1) via the wire. The LAN interface 25 includes a known signal sensing section. The signal sensing section in the LAN interface 25 detects whether or not the LAN interface 25 currently receives an information signal from the hub device 11a (see FIG. 1). The signal sensing section in the LAN interface 25 generates a detection signal "b" representing whether or not the LAN interface 25 currently receives an information signal from the hub device 11a (see FIG. 1). Specifically, the detection signal "b" being in a high level state indicates that the LAN interface 25 currently receives an information signal from the hub device 11a (see FIG. 1). The detection signal "b" being in a low level state indicates that the LAN interface 25 does not currently receive any information signal from the hub device 11a (see FIG. 1). The LAN interface 25 outputs the detection signal "b" to a selection terminal S1 of the selector 27. The LAN interface 25 feeds the output information signal of the hub device 11a (see FIG. 1) to the code sync circuit 26.

The code sync circuit 26 subjects the information signal to a code synchronization process. The code sync circuit 26 outputs the resultant information signal to an input terminal I1 of the selector 27.

The selector 27 selects one from among the output information signal of the code sync circuit 24 and the output information signal of the code sync circuit 26 in response to the detection signals "a" and "b". Specifically, as will be made clear later, this signal selection depends on a combination of the level states (the logic level states) of the detection signals "a" and "b". The selector 27 feeds the selection-resultant information signal to the encoding circuit 28 via its output terminal O.

The encoding circuit 28 encodes the information signal into an electric signal corresponding to a result of modulating a carrier with the information signal. The encoding circuit 28 outputs the electric signal to the driver circuit 29. The driver circuit 29 converts the output electric signal of the encoding circuit 28 into an electric drive signal for the light emitting diode 30. The driver circuit 29 outputs the electric drive signal to the light emitting diode 30.

The light emitting diode 30 converts the output electric signal of the driver circuit 29 into a corresponding optical signal. The light emitting diode 30 transmits the optical signal toward the terminal devices 13a and 13b (see FIG. 1). The optical signal radiated from the light emitting diode 30 uses, for example, infrared light or visible light. It should be noted that the optical signal may be replaced by a radio wave signal.

In the case where the photodiode 21 currently receives an optical signal but the LAN interface 25 does not currently receive any information signal from the hub device 11a (see FIG. 1), the detection signals "a" and "b" are in the high level state and the low level state respectively. In this case, the selector 27 selects the output information signal of the code sync circuit 24 in response to the detection signals "a" and "b" being in the high level state and the low level state respectively. The output information signal of the code sync circuit 24 originates from the output electric signal of the photodiode 21 or the optical signal received by the photodiode 21. The output information signal of the code sync circuit 24 is thus transmitted via the selector 27 to the encoding circuit 28. The encoding circuit 28 encodes the information signal into an electric signal corresponding to a result of modulating a carrier with the information signal. The encoding circuit 28 outputs the electric signal to the driver circuit 29. The output electric signal of the encoding circuit 28 corresponds to the output electric signal of the photodiode 21 or the optical signal received by the photodiode 21. The driver circuit 29 converts the output electric signal of the encoding circuit 28 into an electric drive signal for the light emitting diode 30. The driver circuit 29 outputs the electric drive signal to the light emitting diode 30. The light emitting diode 30 converts the output electric signal of the driver circuit 29 into a corresponding optical signal. The light emitting diode 30 transmits the optical signal toward the terminal devices 13a and 13b (see FIG. 1). The optical signal transmitted from the light emitting diode 30 corresponds to the optical signal received by the photodiode 21. Accordingly, in this case, the repeater 12a implements a repeating process with respect to the optical signal received by the photodiode 21.

In the case where the LAN interface 25 currently receives an information signal from the hub device 11a (see FIG. 1) but the photodiode 21 does not currently receives any optical signal, the detection signals "a" and "b" are in the low level state and the high level state respectively. In this case, the selector 27 selects the output information signal of the code sync circuit 26 in response to the detection signals "a" and "b" being in the low level state and the high level state respectively. The output information signal of the code sync circuit 26 originates from the output information signal of the hub device 11a (see FIG. 1). The output information signal of the code sync circuit 26 is thus transmitted via the selector 27 to the encoding circuit 28. The encoding circuit 28 encodes the information signal into an electric signal corresponding to a result of modulating a carrier with the information signal. The encoding circuit 28 outputs the electric signal to the driver circuit 29. The driver circuit 29 converts the output electric signal of the encoding circuit 28 into an electric drive signal for the light emitting diode 30. The driver circuit 29 outputs the electric drive signal to the light emitting diode 30. The light emitting diode 30 converts the output electric signal of the driver circuit 29 into a corresponding optical signal. The light emitting diode 30 transmits the optical signal toward the terminal devices 13a and 13b (see FIG. 1). Accordingly, in this case, the repeater 12a transmits the output information signal of the hub device 11a (see FIG. 1) as an optical signal.

In the case where the photodiode 21 currently receives an optical signal and also the LAN interface 25 currently receives an information signal from the hub device 11a (see FIG. 1), both the detection signals "a" and "b" are in the high level states. In this case, the selector 27 selects the output information signal of the code sync circuit 26 in response to the detection signals "a" and "b" being in the high level states. The output information signal of the code sync circuit 26 originates from the output information signal of the hub device 11a (see FIG. 1). The output information signal of the code sync circuit 26 is thus transmitted via the selector 27 to the encoding circuit 28. The encoding circuit 28 encodes the information signal into an electric signal corresponding to a result of modulating a carrier with the information signal. The encoding circuit 28 outputs the electric signal to the driver circuit 29. The driver circuit 29 converts the output electric signal of the encoding circuit 28 into an electric drive signal for the light emitting diode 30. The driver circuit 29 outputs the electric drive signal to the light emitting diode 30. The light emitting diode 30 converts the output electric signal of the driver circuit 29, into a corresponding optical signal. The light emitting diode 30 transmits the optical signal toward the terminal devices 13a and 13b (see FIG. 1). Accordingly, in this case, the repeater 12a transmits the output information signal of the hub device 11a (see FIG. 1) as an optical signal. At the same time, the output information signal of the code sync circuit 24 is fed to both the selector 27 and the LAN interface 25. The output information signal of the code sync circuit 24 is rejected by the selector 27. The output information signal of the code sync circuit 24 originates from the output electric signal of the photodiode 21 or the optical signal received by the photodiode 21. Accordingly, in this case, the repeater 12a fails to implement a repeating process with respect to the optical signal received by the photodiode 21.

Figure 3:
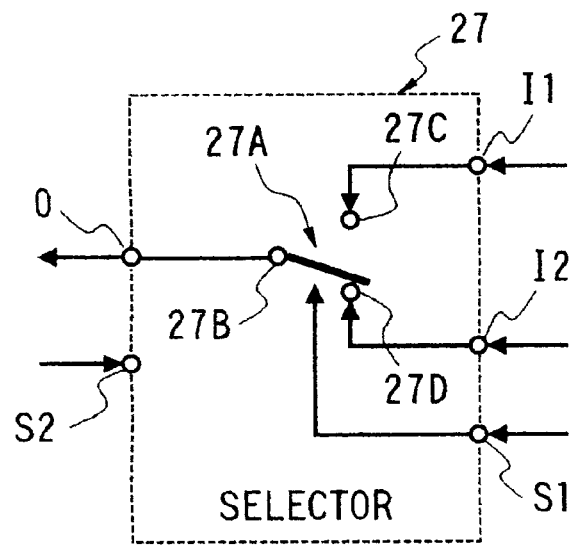
FIG. 3 is a diagram of an example of a part of a selector in FIG. 2.

FIG. 3 shows an example of a related part of the selector 27. The selector 27 in FIG. 3 includes a switch 27A having a movable contact 27B and two fixed contacts 27C and 27D. The movable contact 27B of the switch 27 selectively touches either the fixed contact 27C or the fixed contact 27D thereof. The fixed contact 27C of the switch 27A receives the output information signal of the code sync circuit 26 via the selector input terminal I1. The fixed contact 27D of the switch 27A receives the output information signal of the code sync circuit 24 via the selector input terminal I2. The movable contact 27B of the switch 27A leads to the encoding circuit 28 via the selector output terminal O. The switch 27A has a control terminal which receives the detection signal "b" from the LAN interface 25 via the selector selection terminal S1. The selector selection terminal S2 which receives the detection signal "a" from the carrier sensing circuit 43 has no connection. When the detection signal "b" assumes the low level state, the switch 27A touches the fixed contact 27D and thus selects the output information signal of the code sync circuit 24. When the detection signal "b" assumes the high level state, the switch 27A touches the fixed contact 27C and thus selects the output information signal of the code sync circuit 26 regardless of the state of the detection signal "a".

The terminal devices 13a, 13b, and 13c are similar in structure. Therefore, only the structure of the terminal device 13a will be explained hereinafter.

Figure 4:
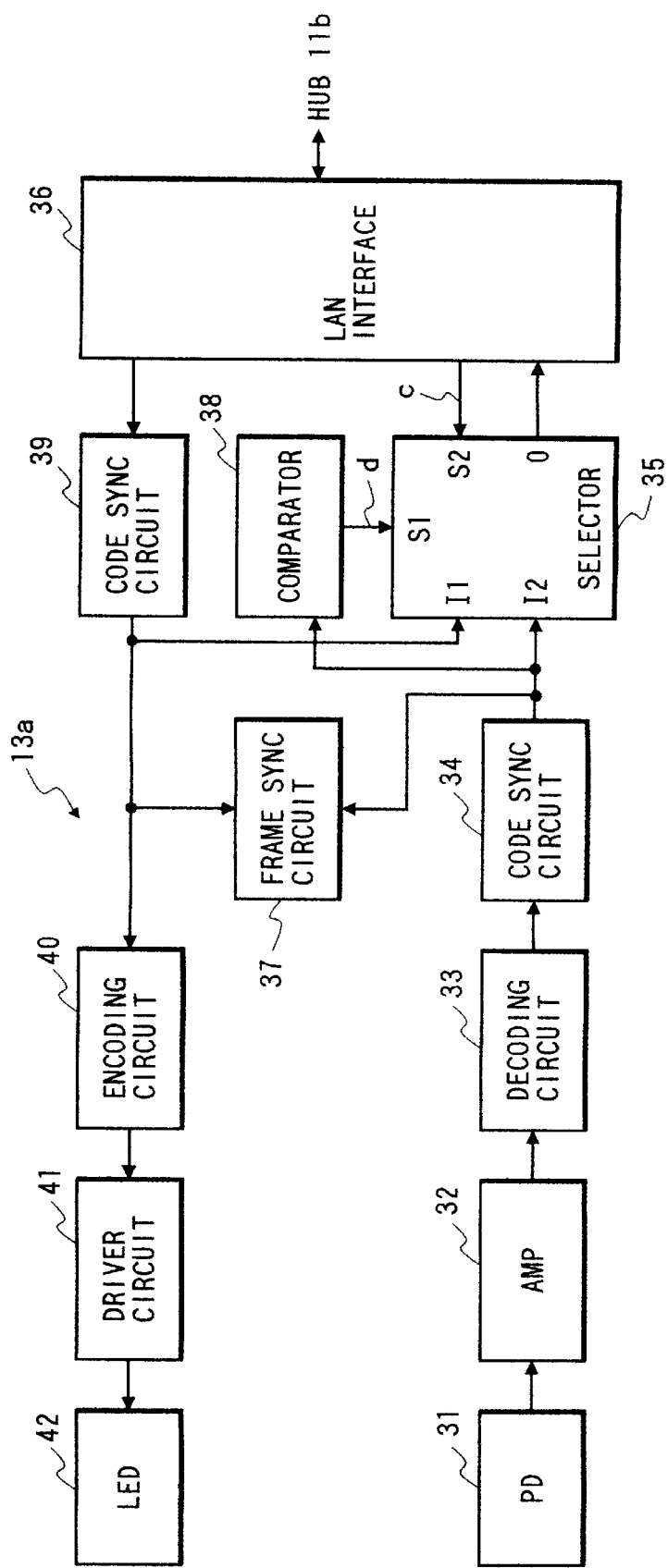
FIG. 4 is a block diagram of a terminal device in FIG. 1.

As shown in FIG. 4, the terminal device 13a includes a photodiode (or a photodiode array) 31, an amplifier 32, a decoding circuit 33, a code sync circuit 34, a selector 35, a LAN interface 36, a frame sync circuit 37, a comparator 38, a code sync circuit 39, an encoding circuit 40, a driver circuit 41, and a light emitting diode (or a light emitting diode array) 42.

The photodiode 31 is successively followed by the amplifier 32, the decoding circuit 33, and the code sync circuit 34. The output terminal of the code sync circuit 34 is connected to the selector 35, the frame sync circuit 37, and the comparator 38. The selector 35 is connected to the LAN interface 36. The output terminal of the frame sync circuit 37 is connected to the comparator 38. The output terminal of the comparator 38 is connected to the selector 35. The LAN interface 36 is connected to the wire which leads to the hub device 11b (see FIG. 1). The LAN interface 36 is connected to the input terminal of the code sync circuit 39. The output terminal of the code sync circuit 39 is connected to the selector 35 and the frame sync circuit 37. In addition, the code sync circuit 39 is successively followed by the encoding circuit 40, the driver circuit 41, and the light emitting diode 42.

The photodiode 31 receives an optical signal from the repeater 12a (see FIG. 1), and converts the optical signal into a corresponding electric signal. The photodiode 31 outputs the electric signal to the amplifier 32. The amplifier 32 enlarges the output signal of the photodiode 31. The amplifier 32 outputs the enlargement-resultant signal to the decoding circuit 33. The optical signal handled by the photodiode 31 uses, for example, infrared light or visible light. It should be noted that the optical signal may be replaced by a radio wave signal.

The decoding circuit 33 decodes the output signal of the amplifier 32 into an information signal (data). In other words, the decoding circuit 33 recovers an information signal (data) from the output signal of the amplifier 32. The decoding circuit 33 outputs the information signal to the code sync circuit 34. The code sync circuit 34 subjects the information signal to a code synchronization process. The code sync circuit 34 outputs the resultant information signal to an input terminal I2 of the selector 35, a first input terminal of the frame sync circuit 37, and a first input terminal of the comparator 38. When predetermined conditions are satisfied, the selector 35 transmits the output information signal of the code sync circuit 34 to the LAN interface 36. The LAN interface 36 can transmit the output information signal of the code sync circuit 34 to the hub device 11b (see FIG. 1) via the wire.

The LAN interface 36 can receive an information signal (data) from the hub device 11b (see FIG. 1) via the wire. The LAN interface 36 includes a known signal sensing section. The signal sensing section in the LAN interface 36 detects whether or not the LAN interface 36 currently receives an information signal from the hub device 11b (see FIG. 1). The signal sensing section in the LAN interface 36 generates a detection signal "c" representing whether or not the LAN interface 36 currently receives an information signal from the hub device 11b (see FIG. 1). Specifically, the detection signal "c" being in a high level state indicates that the LAN interface 36 currently receives an information signal from the hub device 11b (see FIG. 1). The detection signal "c" being in a low level state indicates that the LAN interface 36 does not currently receive any information signal from the hub device 11b (see FIG. 1). The LAN interface 36 outputs the detection signal "c" to a selection terminal S2 of the selector 35. The LAN interface 36 feeds the output information signal of the hub device 11b (see FIG. 1) to the code sync circuit 39.

The code sync circuit 39 subjects the information signal to a code synchronization process. The code sync circuit 39 outputs the resultant information signal to an input terminal I1 of the selector 35. Also, the code sync circuit 39 outputs the resultant information signal to a second input terminal of the frame sync circuit 37. Furthermore, the code sync circuit 39 outputs the resultant information signal to the encoding circuit 40.

The frame sync circuit 37 delays the output information signal of the code sync circuit 39 in response to the output information signal of the code sync circuit 34 to provide frame synchronization. In other words, the frame sync circuit 37 delays the output information signal of the code sync circuit 39 into an information signal frame-synchronized with the output information signal of the code sync circuit 34. The frame sync circuit 37 outputs the delay-resultant information signal to a second input terminal of the comparator 38.

The comparator 38 decides whether or not the output information signal of the frame sync circuit 37 and the output information signal of the code sync circuit 34 are equal to each other. When the output information signal of the frame sync circuit 37 and the output information signal of the code sync circuit 34 are equal to each other, the comparator 38 outputs a high-level detection signal "d" to a selection terminal S1 of the selector 35 as an equality-indicating signal. Otherwise, the comparator 38 outputs a low-level detection signal "d" to the selection terminal S1 of the selector 35 as an inequality-indicating signal.

The selector 35 can select one from among the output information signal of the code sync circuit 34 and the output information signal of the code sync circuit 39 in response to the detection signals "c" and "d". Specifically, as will be made clear later, this signal selection depends on a combination of the level states (the logic level states) of the detection signals "c" and "d". In addition, the selector 35 can select neither the output information signal of the code sync circuit 34 nor the output information signal of the code sync circuit 39 when the detection signals "c" and "d" assume predetermined states respectively. The selector 35 feeds the selection-resultant information signal to the LAN interface 36 via its output terminal O. The LAN interface 36 transmits the output information signal of the selector 35 to the hub device 11b (see FIG. 1) via the wire.

As previously described, the code sync circuit 39 outputs the information signal to the encoding circuit 40. The encoding circuit 40 encodes the information signal into an electric signal corresponding to a result of modulating a carrier with the information signal. The encoding circuit 40 outputs the electric signal to the driver circuit 41. The driver circuit 41 converts the output electric signal of the encoding circuit 40 into an electric drive signal for the light emitting diode 42. The driver circuit 41 outputs the electric drive signal to the light emitting diode 42.

The light emitting diode 42 converts the output electric signal of the driver circuit 41 into a corresponding optical signal. The light emitting diode 42 transmits the optical signal toward the repeater 12a (see FIG. 1). The optical signal radiated from the light emitting diode 42 uses, for example, infrared light or visible light. It should be noted that the optical signal may be replaced by a radio wave signal.

It is now assumed that the photodiode 31 currently receives an optical signal but the LAN interface 36 does not currently receive any information signal from the hub device 11b (see FIG. 1). In this case, the detection signal "c" is in the low level state. The selector 35 selects the output information signal of the code sync circuit 34 in response to the detection signal "c" being in the low level state regardless of the state of the detection signal "d". The output information signal of the code sync circuit 34 originates from the output electric signal of the photodiode 31 or the optical signal received by the photodiode 31. The selector 35 feeds the selection-resultant information signal to the LAN interface 36. The LAN interface 36 transmits the output information signal of the selector 35 to the hub device 11b (see FIG. 1) via the wire. Accordingly, in this case, the terminal device 13a extracts information from the optical signal received by the photodiode 31, and transmits the extracted information to the hub device 11b (see FIG. 1) via the wire.

It is now assumed that the photodiode 31 currently receives an optical signal and also the LAN interface 36 currently receive an information signal from the hub device 11b (see FIG. 1). In this case, the detection signal "c" is in the high level state. The LAN interface 36 transmits the output information signal of the hub device 11b (see FIG. 1) to the code sync circuit 39. The output information signal of the hub device 11b (see FIG. 1) undergoes the code synchronization process in the code sync circuit 39. The resultant information signal is fed from the code sync circuit 39 to the selector 35, the frame sync circuit 37, and the encoding circuit 40. The encoding circuit 40 encodes the information signal into an electric signal corresponding to a result of modulating a carrier with the information signal. The encoding circuit 40 outputs the electric signal to the driver circuit 41. The driver circuit 41 converts the output electric signal of the encoding circuit 40 into an electric drive signal for the light emitting diode 42. The driver circuit 41 outputs the electric drive signal to the light emitting diode 42. The light emitting diode 42 converts the output electric signal of the driver circuit 41 into a corresponding optical signal. The light emitting diode 42 transmits the optical signal toward the repeater 12a (see FIG. 1). Accordingly, in this case, the terminal device 13a transmits the output information signal of the hub device 11b (see FIG. 1) as an optical signal. On the other hand, the photodiode 31 converts the received optical signal into a corresponding electric signal. The photodiode 31 outputs the electric signal to the amplifier 32. The amplifier 32 enlarges the output signal of the photodiode 31. The amplifier 32 outputs the enlargement-resultant signal to the decoding circuit 33. The decoding circuit 33 decodes the output signal of the amplifier 32 into an information signal (data). The decoding circuit 33 outputs the information signal to the code sync circuit 34. The code sync circuit 34 subjects the information signal to a code synchronization process. The code sync circuit 34 outputs the resultant information signal to the selector 35, the frame sync circuit 37, and the comparator 38. As previously explained, the output information signal of the code sync circuit 39 is fed to the frame sync circuit 37. The frame sync circuit 37 delays the output information signal of the code sync circuit 39 into an information signal frame-synchronized with the output information signal of the code sync circuit 34. The frame sync circuit 37 outputs the delay-resultant information signal to the comparator 38. When the output information signal of the frame sync circuit 37 and the output information signal of the code sync circuit 34 are equal to each other, the comparator 38 outputs a high-level detection signal "d" to the selector 35 as an equality-indicating signal. Otherwise, the comparator 38 outputs a low-level detection signal "d" to the selector 35 as an inequality-indicating signal. When the optical signal transmitted by the terminal device 13a is normally returned thereto from the repeater 12a, the output information signal of the frame sync circuit 37 and the output information signal of the code sync circuit 34 are equal to each other so that the detection signal "d" is in the high level state. The selector 35 selects neither the output information signal of the code sync circuit 34 nor the output information signal of the code sync circuit 39 in response to the detection signals "c" and "d" both being in the high level states. As a result, the selector 35 does not output any effective signal to the LAN interface 36, and the LAN interface 36 does not transmit any effective signal to the hub device 11b (see FIG. 1). On the other hand, when the optical signal transmitted by the terminal device 13a is not returned thereto from the repeater 12a since the repeater 12a transmits another optical signal which originates from the output information signal of the hub device 11a (see FIG. 1) or which corresponds to the output optical signal of the terminal device 13b, the output information signal of the frame sync circuit 37 and the output information signal of the code sync circuit 34 are different from each other so that the detection signal "d" is in the low level state. The selector 35 selects the output information signal of the code sync circuit 39 in response to the detection signals "c" and "d" being in the high level state and the low level state respectively. As a result, the selector 35 transmits the output information signal of the code sync circuit 39 to the LAN interface 36. The LAN interface 36 transmits the output information signal of the selector 35 to the hub device 11b (see FIG. 1) via the wire. Since the output information signal of the code sync circuit 39 is equal to the output information signal of the hub device 11b (see FIG. 1), the output information signal of the hub device 11b (see FIG. 1) is returned thereto from the terminal device 13a. The signal return is used as an indication of occupancy of the repeater 12a or signal collisions on the related wireless communication channel. Another signal generated in the terminal device 13a may be transmitted to the hub device 11b (see FIG. 1) instead of the output information signal of the code sync circuit 39. It is preferable that the LAN interface 36 or the hub device 11b (see FIG. 1) takes a suitable step of interrupting the transmission of the output information signal of the hub device 11b as the optical signal in response to the information of signal collision.

In the case where the terminal devices 13a and 13b simultaneously transmit different optical signals to the repeater 12a respectively, the repeater 12a returns a combination of the optical signals to the terminal devices 13a and 13b. In this case, the optical signal received by the terminal device 13a is different from the optical signal transmitted thereby. Also, the optical signal received by the terminal device 13b is different from the optical signal transmitted thereby. Accordingly, the terminal device 13a informs the hub device 11b of occupancy of the repeater 12a or signal collision on the related wireless communication channel. Also, the terminal device 13b informs the terminal device 14b of occupancy of the repeater 12a or signal collisions on the related wireless communication channel.

Figure 5:
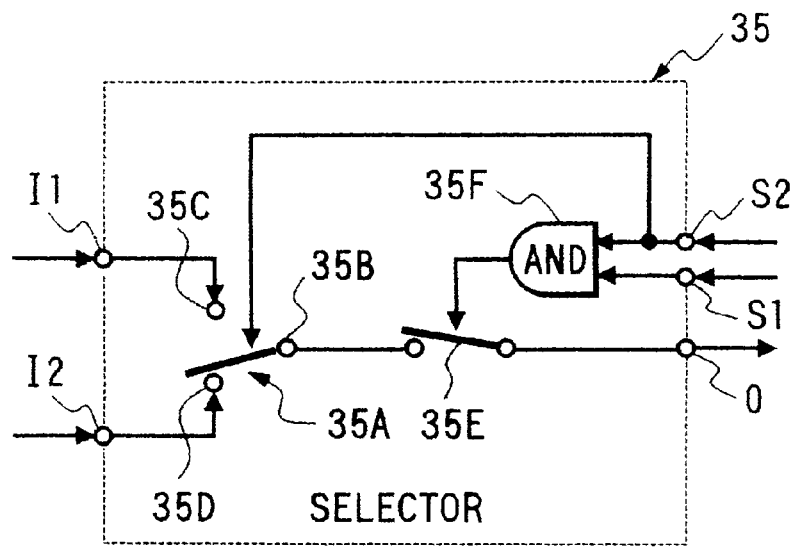
FIG. 5 is a diagram of an example of a part of a selector in FIG. 4.

FIG. 5 shows an example of a related part of the selector 35. The selector 35 in FIG. 3 includes switches 35A and 35E, and an AND gate 35F. The switch 35A has a movable contact 35B and two fixed contacts 35C and 35D. The movable contact 35B of the switch 35A selectively touches either the fixed contact 35C or the fixed contact 35D thereof. The fixed contact 35C of the switch 35A receives the output information signal of the code sync circuit 39 via the selector input terminal I1. The fixed contact 35D of the switch 35A receives the output information signal of the code sync circuit 34 via the selector input terminal I2. The movable contact 35B of the switch 35A is connected via the switch 35E to the selector output terminal O which leads to the LAN interface 36. The switch 35A has a control terminal which receives the detection signal "c" from the LAN interface 36 via the selector selection terminal S2. When the detection signal "c" assumes the low level state, the switch 35A touches the fixed contact 35D and thus selects the output information signal of the code sync circuit 34. When the detection signal "c" assumes the high level state, the switch 35A touches the fixed contact 35C and thus selects the output information signal of the code sync circuit 39. The switch 35E can change between a closed state and an open state. A first input terminal of the AND gate 35F receives the detection signal "c" from the LAN interface 36 via the selector selection terminal S2. A second input terminal of the AND gate 35F receives the detection signal "d" from the comparator 38 via the selector selection terminal S1. The AND gate 35F executes AND operation between the detection signals "c" and "d". The switch 35E has a control terminal connected to the output terminal of the AND gate 35F. When an output signal of the AND gate 35F assumes the low level state, the switch 35E is closed. Accordingly, in this case, the information signal selected by the switch 35A is transmitted through the switch 35E to the LAN interface 36. When the output signal of the AND gate 35F assumes the high level state, the switch 35E is opened. Accordingly, in this case, any effective signal is not transmitted through the selector 35 to the LAN interface 36.

What is claimed is:

1. A terminal device in a wireless communication system having a wireless communication channel, comprising:

first means for converting a first electric signal into a first wireless signal, and transmitting the first wireless signal along the wireless communication channel;

second means for receiving a second wireless signal along the wireless communication channel, and converting the second wireless signal into a second electric signal;

third means for deciding whether or not the first electric signal and the second electric signal are equal to each other to detect whether or not a signal collision occurs on the wireless communication channel;

fourth means for generating a third electric signal representative of occurrence of a signal collision on the wireless communication channel when the third means decides that the first electric signal and the second electric signal are not equal to each other; and fifth means for generating the third electric signal from the first electric signal.

2. A wireless communication system comprising:

a repeater; and a terminal device connected to the repeater via a wireless communication channel;

wherein the terminal device comprises:

a) first means for converting a first electric signal into a first wireless signal, and transmitting the first wireless signal toward the repeater along the wireless communication channel;

b) second means for receiving a second wireless signal from the repeater via the wireless communication channel, and converting the second wireless signal into a second electric signal; and c) third means for deciding whether or not the first electric signal and the second electric signal are equal to each other to detect whether or not a signal collision occurs on the wireless communication channel;

d) fourth means for generating a third electric signal representative of occurrence of a signal collision on the wireless communication channel when the third means decides that the first electric signal and the second electric signal are not equal to each other; and e) fifth means for generating the third electric signal from the first electric signal.

3. A wireless communication system comprising:

a repeater; and a terminal device connected to the repeater via a wireless communication channel;

wherein the repeater comprises:

a) first means for receiving a first wireless signal from the terminal device via the wireless communication channel;

b) second means for converting an electric signal into a second wireless signal, and transmitting the second wireless signal toward the terminal device along the wireless communication channel;
c) third means for detecting whether or not the electric signal is present;
d) fourth means for disabling the second means, and repeating the first wireless signal and transmitting the first wireless signal toward the terminal device along the wireless communication channel when the third means detects that the electric signal is not present; and
e) fifth means for enabling the second means and inhibiting the fourth means from repeating the first wireless signal when the third means detects that the electric signal is present.

* * * * *